(12) United States Patent
Satake et al.

(10) Patent No.: US 11,114,888 B2
(45) Date of Patent: Sep. 7, 2021

(54) POWER SUPPLY DEVICE

(71) Applicant: Yazaki Corporation, Tokyo (JP)

(72) Inventors: Shuuji Satake, Shizuoka (JP); Yoshihito Aoki, Shizuoka (JP); Hiroo Yabe, Shizuoka (JP); Tsutomu Saigo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/986,213

(22) Filed: Aug. 5, 2020

(65) Prior Publication Data
US 2021/0050740 A1 Feb. 18, 2021

(30) Foreign Application Priority Data

Aug. 13, 2019 (JP) .............................. JP2019-148317

(51) Int. Cl.
| | |
|---|---|
| *B60R 16/03* | (2006.01) |
| *H02H 3/05* | (2006.01) |
| *H02J 7/14* | (2006.01) |
| *H02J 9/06* | (2006.01) |
| *H02J 1/10* | (2006.01) |
| *H02M 3/145* | (2006.01) |

(52) U.S. Cl.
CPC ................ *H02J 9/06* (2013.01); *H02J 1/102* (2013.01); *H02M 3/145* (2013.01)

(58) Field of Classification Search
USPC .......................................... 307/65, 9.1, 10.1
See application file for complete search history.

(56) References Cited

U.S. PATENT DOCUMENTS

| | | | |
|---|---|---|---|
| 2016/0156179 A1* | 6/2016 | Walter ................... | H02H 3/202 361/91.1 |
| 2017/0267194 A1 | 9/2017 | Aruga et al. | |
| 2019/0071038 A1 | 3/2019 | Maekawa | |

FOREIGN PATENT DOCUMENTS

| | | |
|---|---|---|
| DE | 10 2015 101 235 A1 | 7/2016 |
| JP | 2017-169407 A | 9/2017 |
| JP | 2017-195653 A | 10/2017 |
| JP | 2017195653 * | 10/2017 |
| WO | 2018/116741 A1 | 6/2018 |

* cited by examiner

*Primary Examiner* — Toan T Vu
*Assistant Examiner* — Xuan Ly
(74) *Attorney, Agent, or Firm* — Kenealy Vaidya LLP

(57) ABSTRACT

A power supply device includes a main power supply, a sub-power supply, a main power supply path, a sub-power supply path, a power supply selector switch, and a load selector switch group. The main power supply path is connected to the main power supply. The sub-power supply path is different from the main power supply path and is connected to the sub-power supply. The load selector switch group is disposed between the main power supply path and the sub-power supply path, and the load unit, and performs switching so as to connect one of the main power supply path and the sub-power supply path to the load unit and to disconnect the other from the load unit, according to switching of the power supply selector switch.

4 Claims, 4 Drawing Sheets

POWER SUPPLY DEVICE

CROSS-REFERENCE TO RELATED APPLICATION(S)

The present application claims priority to and incorporates by reference the entire contents of Japanese Patent Application No. 2019-148317 filed in Japan on Aug. 13, 2019.

BACKGROUND OF THE INVENTION

1. Field of the Invention

The present invention relates to a power supply device.

2. Description of the Related Art

Conventionally, Japanese Patent Application Laid-open No. 2017-169407 describes, as a power supply device, a power supply device capable of supplying power from a plurality of batteries to a load unit via power supply lines. The power supply device described in Japanese Patent Application Laid-open No. 2017-169407 includes a plurality of fuses. When a ground fault occurs, a fuse near a ground fault location is fused to separate one power supply line from the ground fault location, and power is supplied to the load unit via the other power supply line, so that redundancy is achieved.

Meanwhile, in the power supply device described in Japanese Patent Application Laid-open No. 2017-169407, for example, when a power supply is made redundant, it is desired to reduce the influence of a ground fault on a load unit when the ground fault occurs.

SUMMARY OF THE INVENTION

The present invention has been achieved in view of the above problem, and an object of the present invention is to provide a power supply device capable of appropriately making a power supply redundant.

In order to achieve the above mentioned object, a power supply device according to one aspect of the present invention includes a main power supply that supplies power to a load unit; a sub-power supply that is a power supply different from the main power supply and supplies power to the load unit; a main power supply path that is connected to the main power supply; a sub-power supply path that is a power supply path different from the main power supply path and is connected to the sub-power supply; a power supply selector that is switched between a first state where power can be supplied from the main power supply via the main power supply path to the load unit and a second state where power can be supplied from the sub-power supply via the sub-power supply path to the load unit; and a load supply path selector that is disposed between the main power supply path and the sub-power supply path, and the load unit, and performs switching so as to connect one of the main power supply path and the sub-power supply path to the load unit and disconnect the other of the main power supply path and the sub-power supply path from the load unit according to switching of the power supply selector.

According to another aspect of the present invention, in the power supply device, it is preferable that when the main power supply path is normal, the power supply selector is switched to the first state, and the load supply path selector performs switching so as to connect the main power supply path to the load unit and disconnect the sub-power supply path from the load unit, and when the main power supply path is abnormal, the power supply selector is switched to the second state, and the load supply path selector performs switching so as to connect the sub-power supply path to the load unit and disconnect the main power supply path from the load unit.

According to still another aspect of the present invention, in the power supply device, it is preferable that the load supply path selector includes a main terminal connected to the main power supply path, a sub-terminal connected to the sub-power supply path, and one load terminal connected to the load unit, and the one load terminal is connected to one of the main terminal and the sub-terminal and the one load terminal is not connected to the other of the main terminal and the sub-terminal.

According to still another aspect of the present invention, in the power supply device, it is preferable that the power supply selector is configured to include a DC/DC converter that transforms a voltage of DC power, and the DC/DC converter transforms a voltage of power supplied from the main power supply and supplies a transformed voltage to the sub-power supply.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will be described in detail with reference to the drawings. The present invention is not limited by the contents described in the following embodiment. The constituent elements to be described below include those that can be easily assumed by those skilled in the art and those that are substantially the same. Furthermore, the configurations to be described below can be combined as appropriate. Various omissions, substitutions, or changes in the configuration can be made without departing from the scope of the present invention.

Embodiment

Figure 1:
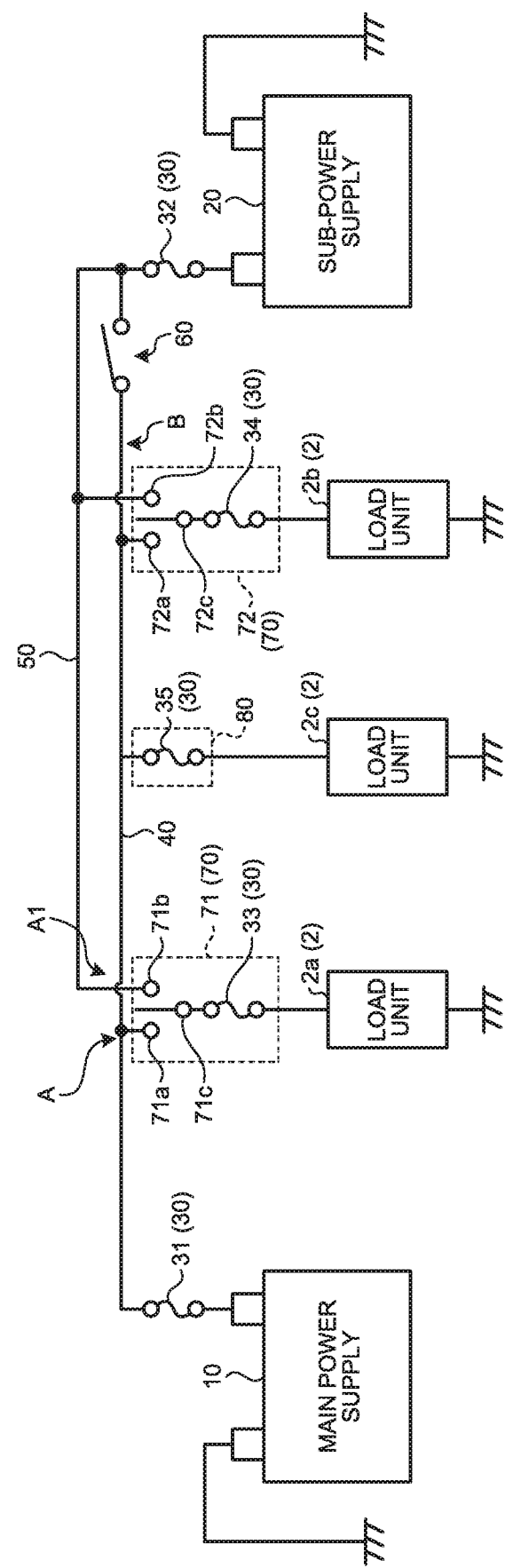
FIG. 1 is a block diagram illustrating a configuration of a power supply device according to an embodiment.
Figure 2:
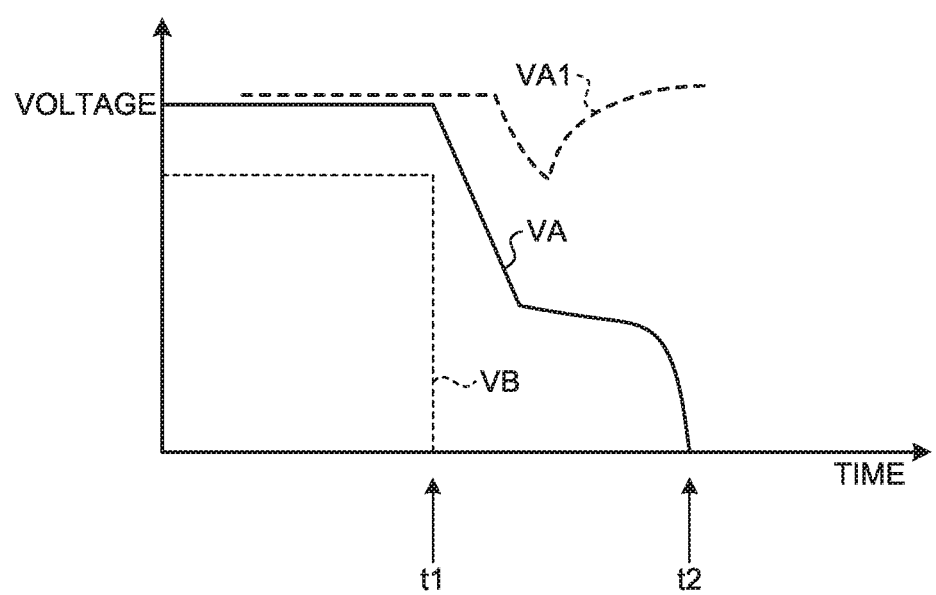
FIG. 2 is a graph illustrating a voltage of power supplied from the power supply device according to the embodiment.

A power supply device 1 according to an embodiment will be described with reference to the drawings. FIG. 1 is a block diagram illustrating a configuration of the power supply device 1 according to the embodiment. FIG. 2 is a graph illustrating a voltage of power supplied from the power supply device 1 according to the embodiment. The power supply device 1 supplies power to a load unit 2. For example, the power supply device 1 is mounted on a vehicle, and supplies power to the load unit 2 of the vehicle. As illustrated in FIG. 1, the power supply device 1 includes a main power supply 10, a sub-power supply 20, a fusing unit 30, a main power supply path 40, a sub-power supply path 50, a power supply selector switch 60, a load selector switch group 70, and a load branch unit 80.

The main power supply 10 supplies power to the load unit 2. The main power supply 10 is, for example, a storage battery capable of charging and discharging DC power, and functions as a main power supply. The main power supply 10 is connected to a power supply unit (not illustrated) such as a generator or a charger, and charges power supplied from the power supply unit. The main power supply 10 is connected via the main power supply path 40 to the load unit 2, and supplies the charged power to the load unit 2 via the main power supply path 40. The main power supply 10 has a positive electrode connected via a fuse 31 to the main power supply path 40 and a negative electrode connected to the ground.

The sub-power supply 20 is a power supply different from the main power supply 10 and supplies power to the load unit 2. The sub-power supply 20 is, for example, a storage battery capable of charging and discharging DC power, and functions as a sub-power supply. The sub-power supply 20 has a positive electrode connected via the main power supply path 40 to the positive electrode of the main power supply 10, and charges the power supplied from the main power supply path 40. The sub-power supply 20 is connected via the sub-power supply path 50 to the load unit 2, and supplies the charged power to the load unit 2 via the sub-power supply path 50. The sub-power supply 20 has a positive electrode connected via the fuse 32 to the sub-power supply path 50 and a negative electrode connected to the ground.

The fusing unit 30 is configured to fuse when an overcurrent flows due to an abnormality such as a short circuit, and interrupt the current. The fusing unit 30 is configured by including fuses 31 to 35. The fuse 31 is disposed between the positive electrode of the main power supply 10 and the main power supply path 40. When an overcurrent flows from the main power supply 10 to the main power supply path 40, the fuse 31 fuses to interrupt the current. The fuse 32 is disposed between the positive electrode of the sub-power supply 20 and the sub-power supply path 50. When an overcurrent flows from the sub-power supply 20 to the sub-power supply path 50, the fuse 32 fuses to interrupt the current. The fuse 33 is disposed between the main power supply path 40 and the sub-power supply path 50, and a load unit 2a. When an overcurrent flows from the main power supply path 40 or the sub-power supply path 50 to the load unit 2a, the fuse 33 fuses to interrupt the current. The fuse 34 is disposed between the main power supply path 40 and the sub-power supply path 50, and a load unit 2b. When an overcurrent flows from the main power supply path 40 or the sub-power supply path 50 to the load unit 2b, the fuse 34 fuses to interrupt the current. The fuse 35 is disposed between the main power supply path 40 and a load unit 2c. When an overcurrent flows from the main power supply path 40 to the load unit 2c, the fuse 35 fuses to interrupt the current.

The main power supply path 40 is a conductive line through which a current flows, and constitutes a trunk line that is a main power supply line as a power supply backbone of a vehicle. The main power supply path 40 is formed of, for example, a wiring material having a round bar conductor or a stranded wire conductor, or a strip-shaped flat conductor having a flat cross-section, these wiring material and strip-shaped flat conductor having a predetermined current capacity.

The main power supply path 40 is connected via the fuse 31 to the positive electrode of the main power supply 10 at one side and is connected via the power supply selector switch 60 and the fuse 32 to the positive electrode of the sub-power supply 20 at the other side. Further, the load unit 2 is connected via the load selector switch group 70 to the main power supply path 40 at a branch part branching from the main power supply path 40. The main power supply path 40 outputs power supplied from the main power supply 10 to the sub-power supply 20 and the load unit 2.

The sub-power supply path 50 is a conductive line through which a current flows, and constitutes a trunk line that is a main power supply line as a power supply backbone of a vehicle. The sub-power supply path 50 is formed of, for example, a wiring material having a round bar conductor or a stranded wire conductor, or a strip-shaped flat conductor having a flat cross-section, these wiring material and strip-shaped flat conductor having a predetermined current capacity.

The sub-power supply path 50 is a power supply path different from the main power supply path 40, and is connected via the fuse 32 to the positive electrode of the sub-power supply 20 at one side and is connected via the load selector switch group 70 to the load unit 2 at the other side. Further, the load unit 2 is connected via the load selector switch group 70 to the sub-power supply path 50 at a branch part branching from the sub-power supply path 50. The sub-power supply path 50 outputs power supplied from the sub-power supply 20 to the load unit 2.

The power supply selector switch 60 is a switch that is turned on to turn on electricity and is turned off to interrupt a current. The power supply selector switch 60 is disposed between a load selector switch 72 on a side of the sub-power supply 20 and the sub-power supply 20 in the main power supply path 40. The power supply selector switch 60 is on-off controlled by a switch control unit (not illustrated) and switches the power supply to the load unit 2 to one of the main power supply 10 and the sub-power supply 20.

Here, the switch control unit determines an abnormality (short circuit) in the main power supply path 40 based on a result of detecting the voltage of the main power supply path 40. The switch control unit determines that the main power supply path 40 is normal when the voltage of the main power supply path 40 is equal to or higher than a predetermined reference voltage, and determines that the main power supply path 40 is abnormal (short circuit) when the voltage of the main power supply path 40 is lower than the reference voltage.

When the power supply selector switch 60 is turned on by the switch control unit, power is supplied from the main power supply 10 via the main power supply path 40 to the load unit 2. When the power supply selector switch 60 is turned off by the switch control unit, power is supplied from the sub-power supply 20 via the sub-power supply path 50 to the load unit 2. That is, the power supply selector switch 60 is switched between a first state where power can be supplied from the main power supply 10 via the main power supply path 40 to the load unit 2 and a second state where power can be supplied from the sub-power supply 20 via the sub-power supply path 50 to the load unit 2.

The load selector switch group 70 is a switch group that is turned on to turn on electricity and is turned off to interrupt a current. The load selector switch group 70 is disposed between the main power supply path 40 and the sub-power supply path 50, and the load unit 2. The load selector switch group 70 performs switching so as to connect one of the main power supply path 40 and the sub-power supply path 50 to the load unit 2 and to disconnect the other of the main power supply path 40 and the sub-power supply paths 50 from the load unit 2, according to switching of the power supply selector switch 60.

The load selector switch group 70 includes, for example, a voltage detector (not illustrated) that detects a main power supply voltage that is a voltage applied from the main power supply 10 to the main power supply path 40 and a sub-power supply voltage that is a voltage applied from the sub-power supply 20 to the sub-power supply path 50. The load selector switch group 70 switches the connection of the load unit 2 based on a result of detection of the voltage detector. For example, when the main power supply voltage is higher than the sub-power supply voltage, the load selector switch group 70 performs switching so as to connect the main power supply path 40 to the load unit 2 and disconnect the sub-power supply path 50 from the load unit 2. On the other hand, when the sub-power supply voltage is higher than the main power supply voltage, the load selector switch group 70 performs switching so as to connect the sub-power supply path 50 to the load unit 2 and disconnect the main power supply path 40 from the load unit 2.

When the power supply voltage still decreases after the power supply path is switched to the main power supply path 40 or the sub-power supply path 50, the load selector switch group 70 keeps a state where the power supply voltage is decreased until the fusing unit 30 is fused, because a short circuit probably occurs on a downstream side of a branch part of the power supply path.

The load selector switch group 70 is configured by including a plurality of load selector switches 71 and 72. The load selector switch 71 is disposed between the main power supply path 40 and the sub-power supply path 50, and the load unit 2a. The load selector switch 71 includes a main terminal 71a connected to the main power supply path 40, a sub-terminal 71b connected to the sub-power supply path 50, and one load terminal 71c connected to the load unit 2. The load selector switch 71 connects the one load terminal 71c to one of the main terminal 71a and the sub-terminal 71b and does not connect the one load terminal 71c to the other of the main terminal 71a and the sub-terminals 71b, based on a main power supply voltage and a sub-power supply voltage.

For example, when the main power supply voltage is higher than the sub-power supply voltage, the load selector switch 71 connects the load terminal 71c to the main terminal 71a and does not connect the load terminal 71c to the sub-terminal 71b. Consequently, power can be supplied from the main power supply 10 via the main power supply path 40 to the load unit 2a, and power cannot be supplied from the sub-power supply 20 via the sub-power supply path 50 to the load unit 2a. When the sub-power supply voltage is higher than the main power supply voltage, the load selector switch 71 connects the load terminal 71c to the sub-terminal 71b and does not connect the load terminal 71c to the main terminal 71a. Consequently, power can be supplied from the sub-power supply 20 via the sub-power supply path 50 to the load unit 2a, and power cannot be supplied from the main power supply 10 via the main power supply path 40 to the load unit 2a.

The load selector switch 72 has a similar configuration to the load selector switch 71 described above, and is disposed between the main power supply path 40 and the sub-power supply path 50, and the load unit 2b. The load selector switch 72 includes a main terminal 72a connected to the main power supply path 40, a sub-terminal 72b connected to the sub-power supply path 50, and one load terminal 72c connected to the load unit 2. The load selector switch 72 connects the one load terminal 72c to one of the main terminal 72a and the sub-terminal 72b and does not connect the one load terminal 72c to the other of the main terminal 72a and the sub-terminals 72b, based on a main power supply voltage and a sub-power supply voltage.

For example, when the main power supply voltage is higher than the sub-power supply voltage, the load selector switch 72 connects the load terminal 72c to the main terminal 72a and does not connect the load terminal 72c to the sub-terminal 72b. Consequently, power can be supplied from the main power supply 10 via the main power supply path 40 to the load unit 2b, and power cannot be supplied from the sub-power supply 20 via the sub-power supply path 50 to the load unit 2b. When the sub-power supply voltage is higher than the main power supply voltage, the load selector switch 72 connects the load terminal 72c to the sub-terminal 72b and does not connect the load terminal 72c to the main terminal 72a. Consequently, power can be supplied from the sub-power supply 20 via the sub-power supply path 50 to the load unit 2b, and power cannot be supplied from the main power supply 10 via the main power supply path 40 to the load unit 2b.

The load branch unit 80 is a unit that connects the load unit 2c to the main power supply path 40 via the fuse 35. The load branch unit 80 does not include the load selector switches 71, 72 described above. That is, the load branch unit 80 connects the load unit 2c to the main power supply path 40 without via the load selector switches 71, 72.

Next, an operation of the power supply device 1 will be described. When the main power supply path 40 is normal, the power supply device 1 switches the power supply selector switch 60 to a first state where power can be supplied from the main power supply 10 via the main power supply path 40 to the load unit 2, and the load selector switch group 70 performs switching so as to connect the main power supply path 40 to the load unit 2 and disconnect the sub-power supply path 50 from the load unit 2. On the other hand, when the main power supply path 40 is short-circuited, the power supply device 1 switches the power supply selector switch 60 to a second state where power can be supplied from the sub-power supply 20 via the sub-power supply path 50 to the load unit 2, and the load selector switch group 70 performs switching so as to connect the sub-power supply path 50 to the load unit 2 and disconnect the main power supply path 40 from the load unit 2. At this time, in the power supply device 1, as illustrated in FIG. 2 for example, when the main power supply path 40 is short-circuited at a time point t1, a voltage VB at a position B (position on side of sub-power supply 20) on the main power supply path 40 is substantially zero at the time point t1, and a voltage VA at a position A (position on side of main power supply 10) on the main power supply path 40 gradually decreases to zero from the time point t1 to a time point t2 when a power supply is interrupted. In the power supply device 1, a voltage VA1 at a position A1 on the sub-power supply path 50 temporarily decreases after the time point t1 due to the short circuit, but immediately returns to the original voltage, and power is supplied via the sub-power supply path 50 to the load unit 2.

As described above, the power supply device 1 according to the embodiment includes the main power supply 10, the sub-power supply 20, the main power supply path 40, the sub-power supply path 50, the power supply selector switch 60, and the load selector switch group 70. The main power supply 10 supplies power to the load unit 2. The sub-power supply 20 is a power supply different from the main power supply 10 and supplies power to the load unit 2. The main power supply path 40 is connected to the main power supply 10. The sub-power supply path 50 is a power supply path different from the main power supply path 40 and is connected to the sub-power supply 20. The power supply selector switch 60 is switched between a first state where power can be supplied from the main power supply 10 via the main power supply path 40 to the load unit 2 and a second state where power can be supplied from the sub-power supply 20 via the sub-power supply path 50 to the load unit 2. The load selector switch group 70 is disposed between the main power supply path 40 and the sub-power supply path 50, and the load unit 2, and performs switching so as to connect one of the main power supply path 40 and the sub-power supply path 50 to the load unit 2 and to disconnect the other of the main power supply path 40 and the sub-power supply paths 50 from the load unit 2, according to switching of the power supply selector switch 60.

With this configuration, when the main power supply path 40 is short-circuited for example, the power supply device 1 causes the load selector switch group 70 to perform switching so as to disconnect the main power supply path 40 from the load unit 2. The power supply can thus be switched before a decrease in a power supply voltage that occurs at the time of the short circuit of the main power supply path 40 affects a normal operation of the load unit 2. Consequently, the power supply device 1 can reduce the influence of the short circuit of the main power supply path 40 on the load unit 2, and as a result, the power supply can be appropriately made redundant.

When the main power supply path 40 is normal, the power supply device 1 switches the power supply selector switch 60 to the first state described above, and the load selector switch group 70 performs switching so as to connect the main power supply path 40 to the load unit 2 and disconnect the sub-power supply path 50 from the load unit 2. On the other hand, when the main power supply path 40 is abnormal, the power supply device 1 switches the power supply selector switch 60 to the second state described above, and the load selector switch group 70 performs switching so as to connect the sub-power supply path 50 to the load unit 2 and disconnect the main power supply path 40 from the load unit 2. With this configuration, the power supply device 1 can reduce the influence of the short circuit of the main power supply path 40 on the load unit 2, and as a result, the power supply can be appropriately made redundant.

In the power supply device 1, the load selector switch group 70 includes, for example, the main terminal 71a connected to the main power supply path 40, the sub-terminal 71b connected to the sub-power supply path 50, and one load terminal 71c connected to the load unit 2. The load selector switch group 70 connects the one load terminal 71c to one of the main terminal 71a and the sub-terminal 71b, and does not connect the one load terminal 71c to the other of the main terminal 71a and the sub-terminal 71b. With this configuration, the number of connection lines of the load unit 2 connected to the load terminal 71c can be reduced to one in the power supply device 1 and the load unit 2 does not need to have a redundant connection line as in conventional cases. Connection with the load unit 2 can thus be simplified.

Modification

Figure 3:
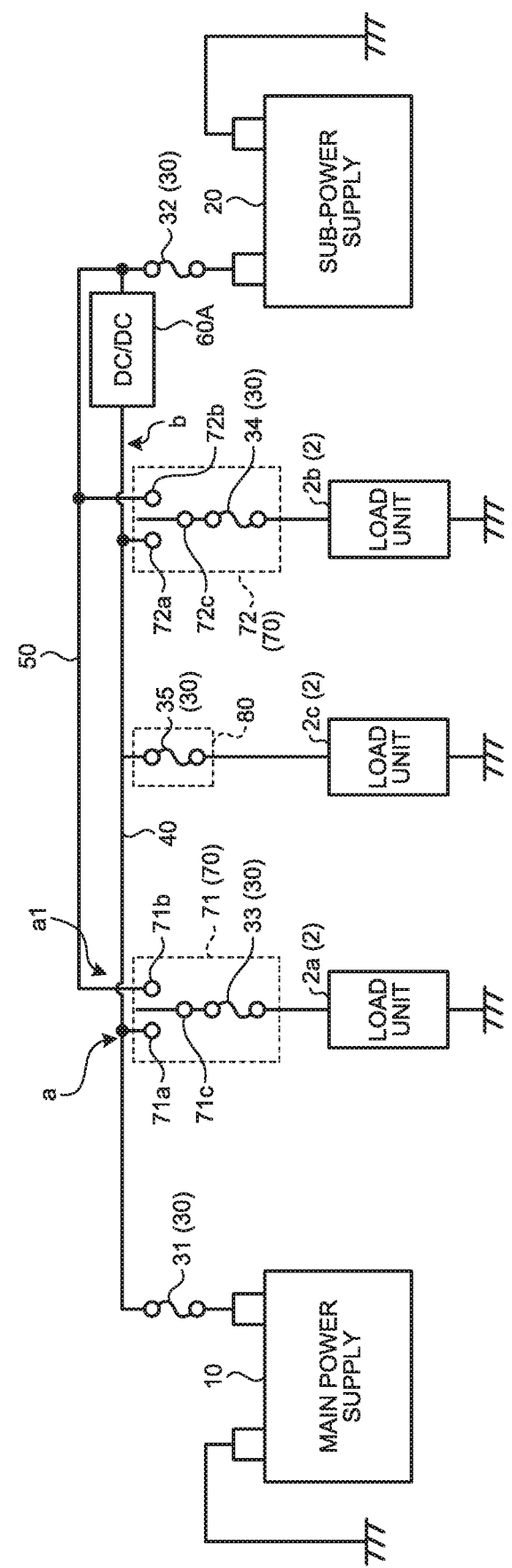
FIG. 3 is a block diagram illustrating a configuration of a power supply device according to a modification of the embodiment.
Figure 4:
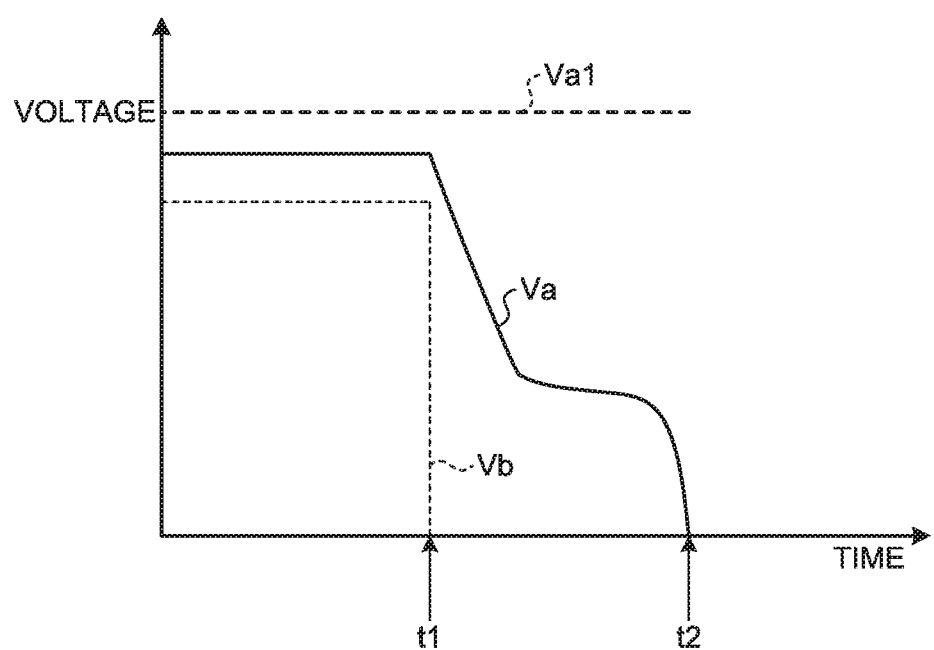
FIG. 4 is a graph illustrating a voltage of power supplied from the power supply device according to the modification of the embodiment.

Next, a modification of the embodiment will be described. In the modification of the embodiment, constituent elements equivalent to those of the embodiment are denoted by the same reference numerals, and a detailed description thereof will be omitted. FIG. 3 is a block diagram illustrating a configuration of a power supply device 1A according to the modification of the embodiment. FIG. 4 is a diagram illustrating a voltage of power supplied from the power supply device 1A according to the modification of the embodiment. The power supply device 1A according to the modification of the embodiment is different from the power supply device 1 according to the embodiment in that a DC/DC converter 60A is provided instead of the power supply selector switch 60.

As illustrated in FIG. 3, the power supply device 1A according to the modification of the embodiment includes the main power supply 10, the sub-power supply 20, the fusing unit 30, the main power supply path 40, the sub-power supply path 50, the DC/DC converter 60A, the load selector switch group 70, and the load branch unit 80.

The DC/DC converter 60A is a transformer that transforms a voltage. The DC/DC converter 60A is disposed between the load selector switch 72 on a side of the sub-power supply 20 and the sub-power supply 20 in the main power supply path 40. The DC/DC converter 60A is controlled by a converter control unit (not illustrated), switches the power supply to the load unit 2 to one of the main power supply 10 and the sub-power supply 20, and transforms a voltage supplied from the main power supply 10 to the sub-power supply 20.

Here, the converter control unit determines an abnormality (short circuit) in the main power supply path 40 based on a result of detecting the voltage of the main power supply path 40. The converter control unit determines that the main power supply path 40 is normal when the voltage of the main power supply path 40 is equal to or higher than a predetermined reference voltage, and determines that the main power supply path 40 is abnormal (short circuit) when the voltage of the main power supply path 40 is lower than the reference voltage.

When the converter control unit determines that the DC/DC converter 60A is normal, power is supplied from the main power supply 10 via the main power supply path 40 to the load unit 2. When the converter control unit determines that the DC/DC converter 60A is abnormal, power is supplied from the sub-power supply 20 via the sub-power supply path 50 to the load unit 2. That is, the DC/DC converter 60A is switched between a first state where power can be supplied from the main power supply 10 via the main power supply path 40 to the load unit 2 and a second state where power can be supplied from the sub-power supply 20 via the sub-power supply path 50 to the load unit 2.

In the power supply device 1A, as illustrated in FIG. 4 for example, when the main power supply path 40 is short-circuited at the time point t1, a voltage Vb at a position b (position on side of sub-power supply 20) on the main power supply path 40 is substantially zero at the time point t1, and a voltage Va at a position a (position on side of main power supply 10) on the main power supply path 40 gradually decreases to zero from the time point t1 to the time point t2 when a power supply is interrupted. As the power supply device 1A transforms (boosts) the voltage of power supplied from the main power supply 10 and supplies the transformed voltage to the sub-power supply 20, it is possible to prevent a voltage Va1 at a position a1 on the sub-power supply path 50 from decreasing after the time point t1 due to the influence of the short circuit, and a constant voltage can thus be kept.

As described above, the power supply device 1A is configured by including the DC/DC converter 60A that transforms the voltage of DC power. The DC/DC converter 60A transforms the voltage of power supplied from the main power supply 10 and supplies the transformed voltage to the sub-power supply 20. With this configuration, when the main power supply path 40 is short-circuited and power is supplied from the sub-power supply 20 via the sub-power supply path 50 to the load unit 2, the power supply device 1A can prevent a voltage from decreasing due to the influence of the short circuit of the main power supply path 40, and keep a constant voltage.

While a configuration example in which the load selector switch 71 includes the main terminal 71a, the sub-terminal 71b, and one load terminal 71c has been described in the above description, the present invention is not limited to this configuration example, and other switch configurations may be used.

Further, while an example in which the load selector switch group 70 uses a higher one of a main power supply voltage and a sub-power supply voltage has been described, the present invention is not limited to this example. For example, the load selector switch group 70 may switch the connection of the load unit 2 based on a result of comparing the main power supply voltage with a predetermined reference voltage. Here, the reference voltage is a voltage that affects a normal operation of the load unit 2. When the main power supply voltage is equal to or higher than the reference voltage, the load selector switch group 70 performs switching so as to connect the main power supply path 40 to the load unit 2 and disconnect the sub-power supply path 50 from the load unit 2. When the main power supply voltage is lower than the reference voltage, the load selector switch group 70 performs switching so as to connect the sub-power supply path 50 to the load unit 2 and disconnect the main power supply path 40 from the load unit 2.

The load selector switch group 70 may include a current detector (not illustrated) that detects a main power supply current that is a current applied from the main power supply 10 to the main power supply path 40 and a sub-power supply current that is a current applied from the sub-power supply 20 to the sub-power supply path 50. In this case, for example, when the sub-power supply current is equal to or more than a predetermined reference current (allowable current of electric wire), the load selector switch group 70 does not switch to the sub-power supply path 50.

Further, the power supply device 1 may include a protector that prevents an electric wire from burning at a connection part of the main power supply 10 and the main power supply path 40, a branch part of the main power supply path 40, or the like when a short circuit occurs.

The power supply device according to the embodiment includes the load supply path selector that performs switching so as to connect one of the main power supply path and the sub-power supply path to the load unit and disconnect the other of the main power supply path and the sub-power supply path from the load unit. Consequently, it is possible to reduce the influence of a ground fault on the load unit when the ground fault occurs, and as a result, a power supply can be appropriately made redundant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
   a main power supply that supplies power to a load unit;
   a sub-power supply that is a power supply different from the main power supply and supplies power to the load unit;
   a main power supply path that is connected to the main power supply;
   a sub-power supply path that is a power supply path different from the main power supply path and is connected to the sub-power supply;
   a power supply selector that is switched between a first state where power can be supplied from the main power supply via the main power supply path to the load unit and a second state where power can be supplied from the sub-power supply via the sub-power supply path to the load unit; and
   a load supply path selector that is disposed between the main power supply path and the sub-power supply path, and the load unit, and performs switching so as to connect one of the main power supply path and the sub-power supply path to the load unit and disconnect the other of the main power supply path and the sub-power supply path from the load unit according to switching of the power supply selector, wherein
   the load supply path selector includes a main terminal connected to the main power supply path, a sub-terminal connected to the sub-power supply path, and one load terminal connected to the load unit, and the one load terminal is connected to one of the main terminal and the sub-terminal and the one load terminal is not connected to the other of the main terminal and the sub-terminal.

2. The power supply device according to claim 1, wherein
   when the main power supply path is normal, the power supply selector is switched to the first state, and the load supply path selector performs switching so as to connect the main power supply path to the load unit and disconnect the sub-power supply path from the load unit, and
   when the main power supply path is abnormal, the power supply selector is switched to the second state, and the load supply path selector performs switching so as to connect the sub-power supply path to the load unit and disconnect the main power supply path from the load unit.

3. The power supply device according to claim 1, wherein
   the power supply selector is configured to include a DC/DC converter that transforms a voltage of DC power, and
   the DC/DC converter transforms a voltage of power supplied from the main power supply and supplies a transformed voltage to the sub-power supply.

4. The power supply device according to claim 2, wherein
   the power supply selector is configured to include a DC/DC converter that transforms a voltage of DC power, and
   the DC/DC converter transforms a voltage of power supplied from the main power supply and supplies a transformed voltage to the sub-power supply.

* * * * *